United States Patent
Chang

(10) Patent No.: US 8,098,031 B2
(45) Date of Patent: Jan. 17, 2012

(54) ACTIVE BRAKE UNIT

(75) Inventor: Qian Chang, Nürnberg (DE)

(73) Assignee: Baumuller Nurnberg GmbH, Nuremberg (DE)

( * ) Notice: Subject to any disclaimer, the term of this patent is extended or adjusted under 35 U.S.C. 154(b) by 205 days.

(21) Appl. No.: 12/515,293

(22) PCT Filed: Nov. 28, 2006

(86) PCT No.: PCT/EP2006/068998
§ 371 (c)(1),
(2), (4) Date: Jan. 15, 2010

(87) PCT Pub. No.: WO2008/064716
PCT Pub. Date: Jun. 5, 2008

(65) Prior Publication Data
US 2010/0141187 A1    Jun. 10, 2010

(51) Int. Cl.
*H02P 3/14* (2006.01)
(52) U.S. Cl. ........................ 318/376; 318/381
(58) Field of Classification Search .................. 318/362, 318/375–381
See application file for complete search history.

(56) References Cited

U.S. PATENT DOCUMENTS

| | | | | |
|---|---|---|---|---|
| 4,093,900 A | * | 6/1978 | Plunkett | ........................ 318/370 |
| 4,353,023 A | | 10/1982 | Kawada et al. | |
| 5,631,813 A | | 5/1997 | Ikeshita | |
| 5,814,954 A | * | 9/1998 | Suzuki et al. | ................ 318/376 |
| 5,992,950 A | * | 11/1999 | Kumar et al. | ................ 303/151 |

FOREIGN PATENT DOCUMENTS

| | | |
|---|---|---|
| DE | 19509827 A1 | 2/1996 |
| EP | 0026038 A1 | 4/1981 |
| JP | 58116095 A | 7/1983 |
| JP | 59017880 A | 1/1984 |

* cited by examiner

Primary Examiner — Bentsu Ro
(74) Attorney, Agent, or Firm — Frank H. Foster; Kremblas & Foster

(57) ABSTRACT

The invention relates to a circuit arrangement for recirculating the energy produced during the braking of electric motors into a supply system. The object of the invention is to implement the feeding of the energy that can be obtained when braking electric motors to the supply system without the use of an isolating transformer. Said object is solved by a forward branch (3), comprising a rectifier (32) connected to the supply system (1). The rectifier is guided via a first intermediate circuit (33) to a first inverter (34) that is connected to the motor (2), and a backward branch (4), comprising a second intermediate circuit (42) connected to the output of the first intermediate circuit (33), wherein a second inverter (41) is connected to the second intermediate circuit, and the second inverter in turn is connected to the supply system (1) via a mains circuit (5). Each pole of the second intermediate circuit (42) is connected via a series connection of a current-compensated throttle (61, 62) and a diode (64, 65) to the output of the first intermediate circuit (33).

7 Claims, 1 Drawing Sheet

ACTIVE BRAKE UNIT

BACKGROUND OF THE INVENTION

1. Field of the Invention

The invention relates to a circuit arrangement for recirculating the energy produced during the braking of electric motors into a supply system. Preferred areas of application for devices of this type include the drives of machine tools and textile, printing and other machines for which frequent starting up and braking is characteristic.

2. Description of the Related Art

Devices for recirculating the energy produced during the braking of electric motors are known in the art. One such device is described in "Unidrive Regen Installation Guide, Issue No. 2" on the website http://www.controltechniques.com. This involves an adaptation of controlled direct current power supplies to other drives. The device is comprised of a power supply branch, which is made up of a voltage-controlled resistive circuit that is connected to the power supply system and an HF filter, a forward branch and a reverse branch. An electric motor is connected to the output side of the forward branch. The forward branch comprises a rectifier, an intermediate circuit and an inverter. The output terminals of the intermediate circuit are also connected via a blocking diode to the reverse branch, which comprises a second inverter and an adapting circuit with a line filter, said adapting circuit being connected via one choke per phase, and an isolating transformer, which is connected to the power supply branch. The isolating transformer effects the galvanic separation of the reverse branch from the supply system, thereby preventing the creation of high circulating currents. However, the isolating transformer has a relatively high volume and represents a major cost factor.

The object of the invention is therefore to implement the feeding of the energy that can be obtained during the braking of electric motors to the supply system without the use of an isolating transformer.

SUMMARY OF THE INVENTION

The object is obtained with an active braking unit having the characterizing features of patent claim 1, in that a forward branch and a reverse branch are connected to the supply system. The forward branch consists of a rectifier, which is connected to the supply system and is guided via a first intermediate circuit to a first inverter, which is connected to the motor. The reverse branch comprises a second intermediate circuit connected to the output of the first intermediate circuit, wherein a second inverter is connected to the second intermediate circuit, and wherein each pole of the second intermediate circuit is connected via the series connection of a current-compensated choke and a diode to the output of the first intermediate circuit. The reverse branch is connected to the supply system via a system adapting circuit.

One advantageous improvement on the invention is presented in the dependent claim, wherein the output voltage of the second inverter is controlled based upon the voltage via the second intermediate circuit. During load operation, the motor is connected to the supply system and thereby forms a sink in current, with speed and torque being adjusted by means of the forward circuit. During braking operation, the voltage of the first intermediate circuit increases, because the flow of current to the motor is adjusted and a reverse current from the motor is generated. The reverse current can advantageously be returned to the intermediate circuit by means of an inverter, which is comprised of insulated gate bipolar transistors (IGBT's), the emitters and collectors of which are connected via freewheeling diodes. According to the invention, the current-compensated chokes limit the current and the current increase which flow into the reverse branch as a result of the increase in voltage at the first intermediate circuit. The voltage occurring at the second intermediate circuit is adjusted using the controlled second inverter. In this way, the blocking diodes prevent a discharge of the first intermediate circuit via the current-compensated chokes, which are series-connected to them, until a transmittance threshold for the diodes, based upon the voltage difference occurring between the first and second intermediate circuits during braking operation, is exceeded. By means of the preferably controlled second inverter, the energy that has then flowed into and been stored in the second intermediate circuit is recirculated to the supply system via the system adapting circuit. In this process, the reverse branch functions as a step-up converter, effecting an adaptation and control of the voltage obtained from the braking energy with respect to the voltage of the supply system. To generate the sinusoidal current, the second inverter is actuated with pulse-width modulated (PWM) signals, so that the harmonics are minimized.

BRIEF DESCRIPTION OF THE DRAWING

In what follows, the invention will be specified in greater detail in the form of a preferred exemplary embodiment in reference to the attached diagram. The diagram shows a circuit diagram illustrating the principle of an active braking unit according to the invention.

DETAILED DESCRIPTION OF THE INVENTION

Figure 1:
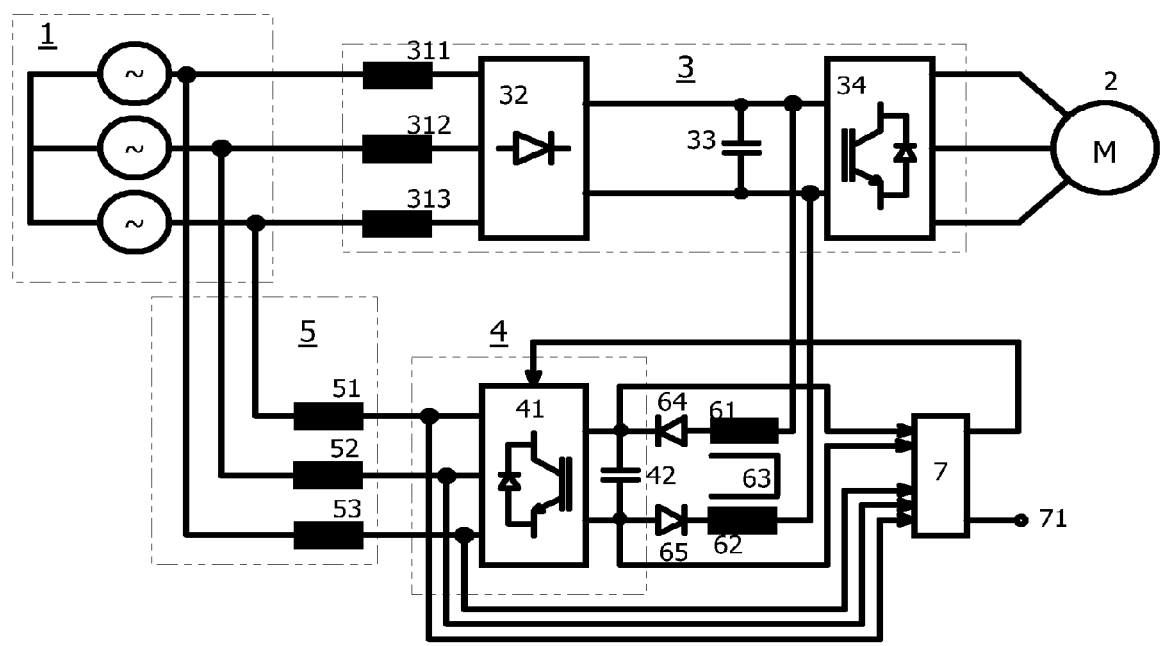

A motor 2 is connected via a forward branch 3 to a 3-phase system 1. The forward branch 3 is comprised of one commutating coil or commutating choke 311, 312, 313 per phase, which are guided to a rectifier 32. Diodes or thyristors can be used as rectifier elements. The rectifier 32 is connected via a first intermediate circuit 33 to a schematically represented first 3-phase inverter 34, the switching elements of which are embodied as insulated gate bipolar transistors (IGBT) with freewheeling diodes that are connected in parallel to the emitter-collector paths. The motor 2 is connected to the outputs of the first inverter 34. To return the braking energy that is produced during braking of the motor 2, a reverse branch 4 is provided, the outputs of which are guided to the 3-phase system 1. The reverse branch 4 is connected to the output of the first intermediate circuit 33 via two coils 61, 62, which are magnetically coupled via a shared core 63 and are wound opposite one another, and which therefore function as current-compensated chokes, and via diodes 64, 65, which are series connected to the coils in the forward direction with respect to the terminals on the first intermediate circuit 33. The reverse branch 4 is comprised of a second intermediate circuit 42 and a second inverter 41, which is identical in structure to the first inverter 34. Parallel to the second intermediate circuit 42, a controller 7 is connected, the output of which is connected to the gate terminals of the insulated gate bipolar transistor (IGBT) of the second inverter 41. The intermediate circuit voltage detected by the controller 7 at the second intermediate circuit 42 is controlled to a setpoint value set at the input 71. For this purpose, according to another optional embodiment of the invention, as an alternative or in addition to the above, a return of the three output phase currents from the second inverter 41 (which are conducted to HF chokes 51, 52, 53) to corresponding inputs of the controller 7 can be provided as indicated in the drawing. The output terminals of the second inverter 41 are connected to the 3-phase system 1 via a system adapting circuit 5, which consists of the series connection of one HF choke 51, 52, 53 per phase. When the motor 2 is braked, the first intermediate circuit voltage is increased, because the flow of current to the motor 2 is adjusted, and a reverse current from the motor 2 is generated. The reverse current is returned to the first intermediate circuit 33. The current-compensated chokes 61, 62 limit the current flowing into the reverse branch 4 as a result of the voltage increase at the first intermediate circuit 33, along with the corresponding current increase (for functioning see below). The voltage occurring at the second intermediate circuit 42 is adjusted by the controlled second inverter 41. In this process, the blocking diodes 64, 65 prevent a discharge of the second intermediate circuit 42 via the current-compensated chokes 61, 62 that are series connected to them, so that the energy stored in the second intermediate circuit 42 is recirculated via the second inverter 41 and the system adapting circuit 5 into the 3-phase system 1. The reverse branch 4 functions as a step-up converter, whereby an adjustment and control of the voltage obtained from the braking energy is implemented with respect to the voltage of the 3-phase system 1. To generate the sinusoidal current, the second inverter 41 is actuated with pulse-width modulated (PWM) signals, so that the output-side harmonics are minimized.

At the capacitor of the first intermediate circuit 33 or at the output of the rectifier 32 a voltage is present, which amounts to approximately 1.35 times the system voltage (effective value). It is known in the art that with the sinusoidal system voltage, the amplitude amounts to $\sqrt{2}$ times the system effective voltage. $\sqrt{2}$ is approximately 1.4, and in practical applications, the value 1.35 has proven effective because it approximates the mean value of the output voltage from the rectifier with residual ripple. The second intermediate circuit voltage at the capacitor of the second intermediate circuit 42 is controlled via the controller 7. The step-up conversion takes place from the HF chokes 51, 52, 53 to the second intermediate circuit 42. Therefore, the second intermediate circuit voltage is higher than the voltage at the first intermediate circuit 33. When the motor 2 is in drive status, energy from the system 1 is fed to the motor via the rectifier 32, the first intermediate circuit 33 and the first inverter 34. At the same time, because of the blocking diodes 64, 65 the second intermediate circuit is uncoupled from the first intermediate circuit to the same extent. When the motor 2 moves to a braking status, the occurring braking energy is first recirculated via the first inverter 34 into the first intermediate circuit 33. The intermediate circuit voltage of the first intermediate circuit 33 thus increases. Once the voltage in the first intermediate circuit 33 becomes greater than the voltage in the second intermediate circuit 42, the two blocking diodes connect through in the direction of the second inverter 41. It is thereby possible for the braking energy that was first stored in the first intermediate circuit 33 to be recirculated into the system via the two blocking diodes 64, 65 and the second inverter and via the HF chokes 51, 52, 53. If the voltage in the first intermediate circuit 33 is higher than 1.35 times the system voltage due to the returning braking energy, the rectifier 32 blocks the first intermediate circuit 33 from the system 1. An electric separation thus occurs. The blocking diodes 64, 65 then connect through to the second intermediate circuit 42.

Numerical example: The system voltage supplies an effective voltage of 400 volts. The voltage at the capacitor in the first intermediate circuit 33 therefore amounts to 1.35 times, or approximately 540 volts. At the controller input 71, the setpoint value is adjusted to 600 volts, for example. Only when these 600 volts are exceeded in the first intermediate circuit 33 as a result of returning braking energy do the blocking diodes 64, 65 connect through and release the backflow of braking energy via the reverse branch 4.

LIST OF REFERENCE SYMBOLS

1 3-phase system
2 Motor
3 Forward branch
311, 312, 313 Commutating chokes
32 Rectifier
33 First intermediate circuit
34 First IGBT inverter
4 Reverse branch
41 Second IGBT inverter
42 Second intermediate circuit
5 System adapting circuit
51, 52, 53 HF chokes
61, 62 current-compensated chokes
63 Shared coil core
64, 65 Blocking diodes
7 Controller
71 Setpoint value input

The invention claimed is:

1. Active braking unit for recirculating energy that is produced during the braking of electric motors (2) to a supply system (1) with a forward branch (3), comprising a rectifier (32) that is attached to the supply system (1), said rectifier being guided via a first intermediate circuit (33) to a first inverter (34), which is connected to the motor (2), and a reverse branch (4), comprised of a second intermediate circuit (42), which is connected to the output of the first intermediate circuit (33) and has a second inverter (41) connected to it, which second inverter is connected via a system adapting circuit (5) and/or other system coupling means to the supply system (1), characterized in that each pole of the second intermediate circuit (42) is connected to the output of the first intermediate circuit (33) via a series connection of a current-compensated choke (61, 62) and a diode (64, 65).

2. Active braking unit according to claim 1, characterized by a configuration or dimensioning such that when the motor is in driving status, the voltage of the second intermediate circuit (41) is greater than that of the first intermediate circuit (33).

3. Active braking unit according to claim 1, characterized in that the output voltage of the second inverter (41) is controlled based upon the voltage via the second intermediate circuit (42).

4. Active braking unit according to claim 1, characterized in that the output voltage of the second inverter (41) is controlled based upon the output current or currents of the second inverter (41).

5. Active braking unit according to claim 4, characterized in that the corresponding controller (7) has an input (71), which is supplied with a setpoint value, which provides a voltage of the second intermediate circuit (42) that is higher than that of the first intermediate circuit (33) when the motor is in drive status.

6. Active braking unit according to claim 5, characterized by an adjustability at the setpoint value input.

7. Active braking unit according to claim 6, characterized in that the second intermediate circuit (41) is implemented using an intermediate circuit capacitor, which is coupled to the first intermediate circuit via the current-compensated chokes (61, 62) and the blocking diodes (64, 65).

* * * * *